C. M. CHAFFIN.
LAWN CLEANER.
APPLICATION FILED MAR. 8, 1921.
1,417,032.
Patented May 23, 1922.
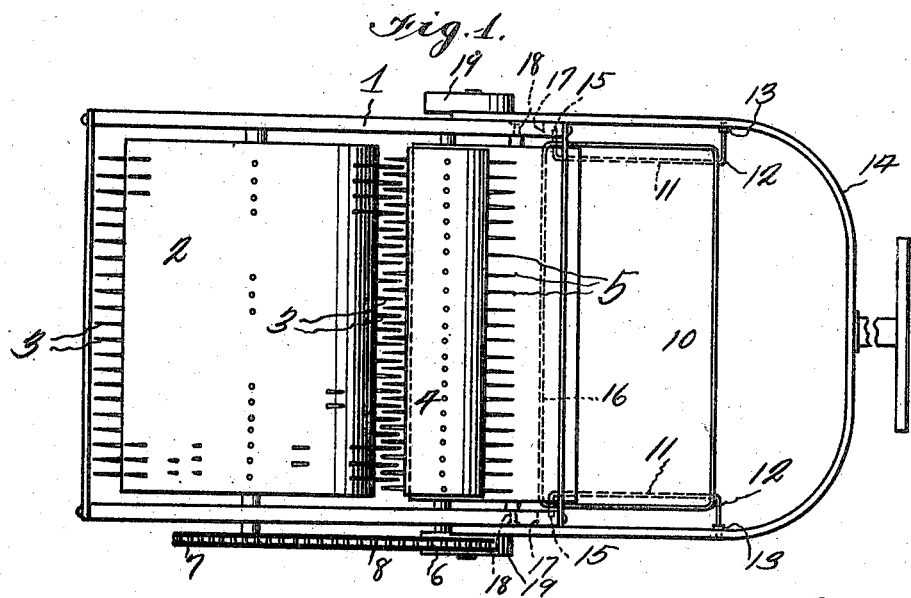
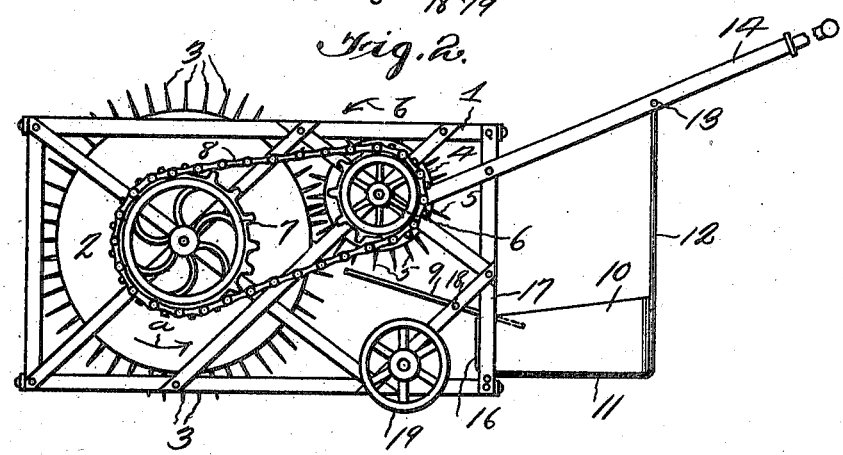
Inventor
C.M. Chaffin
By D. Swift
Attorney

UNITED STATES PATENT OFFICE.

CLARENCE M. CHAFFIN, OF SPRINGFIELD, MISSOURI.

LAWN CLEANER.

1,417,032.　　　　Specification of Letters Patent.　　Patented May 23, 1922.

Application filed March 8, 1921. Serial No. 450,657.

*To all whom it may concern:*

Be it known that I, CLARENCE M. CHAFFIN, a citizen of the United States, residing at Springfield, in the county of Greene, State of Missouri, have invented a new and useful Lawn Cleaner; and I do hereby declare the following to be a full, clear, and exact description of the invention, such as will enable others skilled in the art to which it appertains to make and use the same.

The invention relates to lawn cleaners and has for its object to provide a device of this character comprising a rotatable ground engaging wheel or drum having radially disposed sharpened fingers for engaging and piercing leaves on a lawn, said ground engaging drum being rotatably mounted in a frame. Also to provide to the rear of said drum a similarly constructed drum of smaller diameter having cleaning fingers which move between the fingers of the drum, said smaller drum being connected to the ground engaging drum by means of a sprocket chain which passes around sprockets carried by said drum.

A further object is to provide a hopper adjacent the cleaning drum and into which hopper leaves and the like which are removed from the ground engaging drum are deposited by the cleaning drum.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a top plan view of the lawn cleaner.

Figure 2 is a side elevation of the lawn cleaner.

Referring to the drawings, the numeral 1 designates a rectangular shaped frame, in bearings of which frame a ground engaging drum 2 is rotatably mounted, said drum being horizontally disposed and provided with a plurality of sharpened fingers 3 which engage the ground and pierce leaves as said ground engaging drum and the frame is moved forwardly. The ground engaging drum during the forward movement of the machine as a whole rotates in the direction of the arrow *a* and the sharpened fingers 3, after they have pierced the leaves, carry said leaves upwardly. Rotatably mounted in the frame 1 and adjacent the upper rear side of the ground engaging drum 2 is a cleaning drum 4, said cleaning drum being provided with a plurality of cleaning fingers 5, which interengage with the piercing fingers 3 of the ground engaging drum 2. The cleaning drum 4 is of smaller diameter than the ground engaging drum 2 and rotates in the direction of the arrow *b* which is a reverse direction to the direction of rotation of the ground engaging drum 2. Cleaning drum 4 is provided with a sprocket wheel 6, and around said sprocket wheel and around a larger sprocket wheel 7 carried by the ground engaging drum 2, a sprocket chain 8 extends. It will be seen that as the machine as a whole moves forwardly that the leaves will be gathered from the ground by the piercing member 3 carried rearwardly and upwardly thereby and that as the cleaning drum 4 rotates its cleaning fingers 5 which interengage the piercing fingers 3 will pull the leaves from the piercing fingers 3 and deposit them on the inclined plate 9, down which inclined plate the leaves will slide to a hopper 10, which hopper is preferably made removable so that after the same has become filled it may be easily removed. The hopper 10 is supported on the horizontal portions 11 of L-shaped brackets 12, the upper ends of the vertical portions of which are connected at at 13 to the handle 14 of the machine. The horizontal portion being connected at 15 to the sides of the frame. It will be seen that the forward end 16 of the hopper 10 extends inwardly between the vertical post 17 of the sides of the frame 1 and that said vertical posts prevent longitudinal displacement of the hopper. However, when it is desired to remove the hopper, said hopper may be raised at its rear end, and the inclined plate which is pivotally mounted is frictionally held at 18 may be sufficiently tilted to allow the hopper to be removed.

The machine as a whole is supported on wheels 19 adjacent the rear end of the frame 1, and by means of which wheels the machine as a whole is run over the ground.

From the above it will be seen that a lawn cleaner is provided which is simple in construction, and one wherein the leaves may be quickly gathered from a lawn thereby obviating the loss of time incident to the use of a conventional form of rake now employed for this purpose.

The invention having been set forth what is claimed as new and useful is:—

A lawn cleaner comprising a frame, a rotatable ground engaging drum carried by said frame, leaf piercing engaging fingers carried by said drum, said frame having its lower end positioned to engage the ground and limit the distance the fingers will enter the ground, a second drum rotatably mounted in bearings of the frame and disposed to the rear of the first mentioned drum and adjacent the upper end thereof, said second drum being provided with a plurality of cleaning fingers interengaging with the piercing fingers on the ground engaging drum, connecting means between said drums whereby the second drum will be rotated at a greater rate of speed than the ground engaging drum, a pivoted inclined plate pivoted in the frame, the forward end of said frame being disposed beneath the second drum, a removable hopper carried by the frame, the rear end of the pivoted plate being disposed above the forward end of the hopper, and wheels for supporting the frame, said wheels being located adjacent the rear end thereof.

In testimony whereof I have signed my name to this specification in the presence of two subscribing witnesses.

CLARENCE M. CHAFFIN.

Witnesses:
T. B. JARRETT,
W. S. McCORY.